United States Patent
Rauh

[11] Patent Number: 6,164,719
[45] Date of Patent: Dec. 26, 2000

[54] VENTED AND HEATED SEAT

[75] Inventor: Hans-Georg Rauh, Olching, Germany

[73] Assignee: W.E.T. Automotive Systems AG, Germany

[21] Appl. No.: 09/310,982

[22] Filed: May 13, 1999

[30] Foreign Application Priority Data

May 18, 1998 [DE] Germany .......................... 198 22 243

[51] Int. Cl.[7] ................................................ B60N 2/56
[52] U.S. Cl. .................................. 297/180.12; 297/180.1
[58] Field of Search ....................... 297/180.1, 180.12, 297/180.13, 180.14, 180.11

[56] References Cited

U.S. PATENT DOCUMENTS

| 4,258,706 | 3/1981 | Shank | 297/180.12 X |
| 5,626,021 | 5/1997 | Karunasiri et al. | |
| 5,902,014 | 5/1999 | Dinkel et al. | 297/180.13 X |
| 5,934,748 | 8/1999 | Faust et al. | 297/180.12 |

FOREIGN PATENT DOCUMENTS

| 197 03 516 | 5/1998 | Germany . | |
| 84001885 | 5/1984 | WIPO | 297/180.12 |
| 9625301 | 8/1996 | WIPO . | |

*Primary Examiner*—Peter R. Brown
*Attorney, Agent, or Firm*—Rothwell, Figg, Ernst & Manbeck

[57] ABSTRACT

The presented invention concerns a seat that is equipped with at least one vented and heated ventilation area (3, 4) and at least one additional heated heating surface (5 through 8) on its surface. In order to improve seat temperature comfort, the temperature of the seat surface in the ventilation area (3, 4) can be regulated independently of the temperature of the heating surface (5 through 8).

7 Claims, 2 Drawing Sheets

VENTED AND HEATED SEAT

BACKGROUND OF THE INVENTION

1. Field of the Invention

The presented invention concerns a seat that is equipped with at least one heated heating area and at least one vented and heated ventilation area on its surface.

2. Description of the Background Art

DE 197 03 516 describes a seat with a heating device and a ventilation device in order to maintain the temperature on the seat surface at a comfortable level and to remove moisture. A disadvantage, however, consists of the fact that the heating process of the shown seat is only possible in conjunction with a ventilation process. This effect is not desirable, however, particularly in the heating phase because the subjective perception of the cold environment is reinforced by air that has not yet been sufficiently warmed up.

SUMMARY OF THE INVENTION

The object of the invention therefore consists in further developing the state of the art to the point of making available a seat with improved seat temperature comfort.

When considering the generic features of the invention, this object is attained by the fact that the temperature of the seat surface in the ventilation area can be adjusted independently of the temperature of the heating surface.

The invented seat enables optimal temperature equalization of both the air flow and all seat surfaces that come into contact with the user. Overheating of non-vented areas or too low a temperature of the air flow is thus prevented.

A material-saving and simple version is achieved by providing a plate-like resistance heating element that heats the ventilation area and the additional heating surface, while being able to adjust the current density in the heating element in the ventilation area independently of the remaining surface of the heating element.

When the heating surface and/or the ventilation area of the back rest can be controlled independently of the heating surface and/or the ventilation area of the seat surface, improved settings of the seat temperature are made possible, e.g. to adjust to the respective user's seat position.

To increase seat comfort at higher temperatures of the environment it is useful for the regulation of the seat's ventilation and/or heating to install a control system with which the ventilation area is vented and only the ventilation area is heated for one particular switch position.

The invention is explained with the help of examples and reference to accompanying drawings. The drawings show:

DETAILED DESCRIPTION OF THE INVENTION

Figure 1:
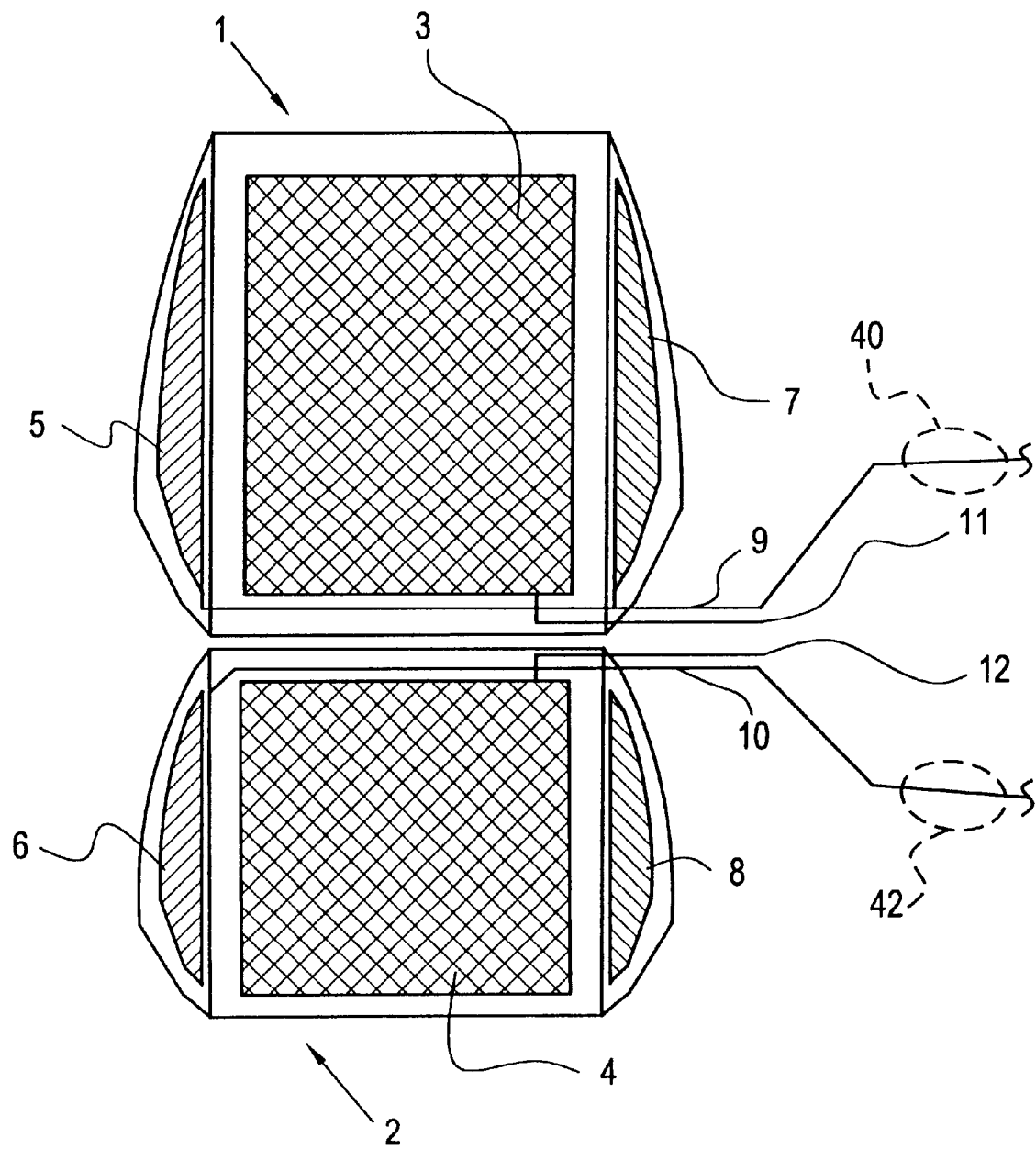
FIG. 1 Diagrammatic top view onto a seat.

FIG. 1 depicts a seat with an back rest 1 and a seat surface 2.

The back rest 1 has a ventilation area 3, which can both be vented and heated. Ventilation means an exchange of air on the seat surface, especially with a directed flow of air. For this, air exiting from the seat should be directed through the seat surface. The heating device of the ventilation area 3 is hooked up to a current source via a connecting line 11.

The back rest is also equipped with additional heating surfaces 5 and 7 on the side of the surface that is facing the user. In the presented example they are heated, but not vented. In order to be supplied with electrical energy, the heating surfaces 5 and 7 are connected with an energy source, e.g. the vehicle battery, via a connecting line 9 and a control device 40.

The seat surface 2 is also equipped with a ventilation area 4 that is vented and heated. Its power supply is ensured by a connecting line 12. The seat area 2 as well has additional heating surfaces 6 and 8 on the side, which in the examples shown are heated, but not vented. They are hooked up to a current source via a connecting line 10 or an inserted control device 42.

Figure 2:
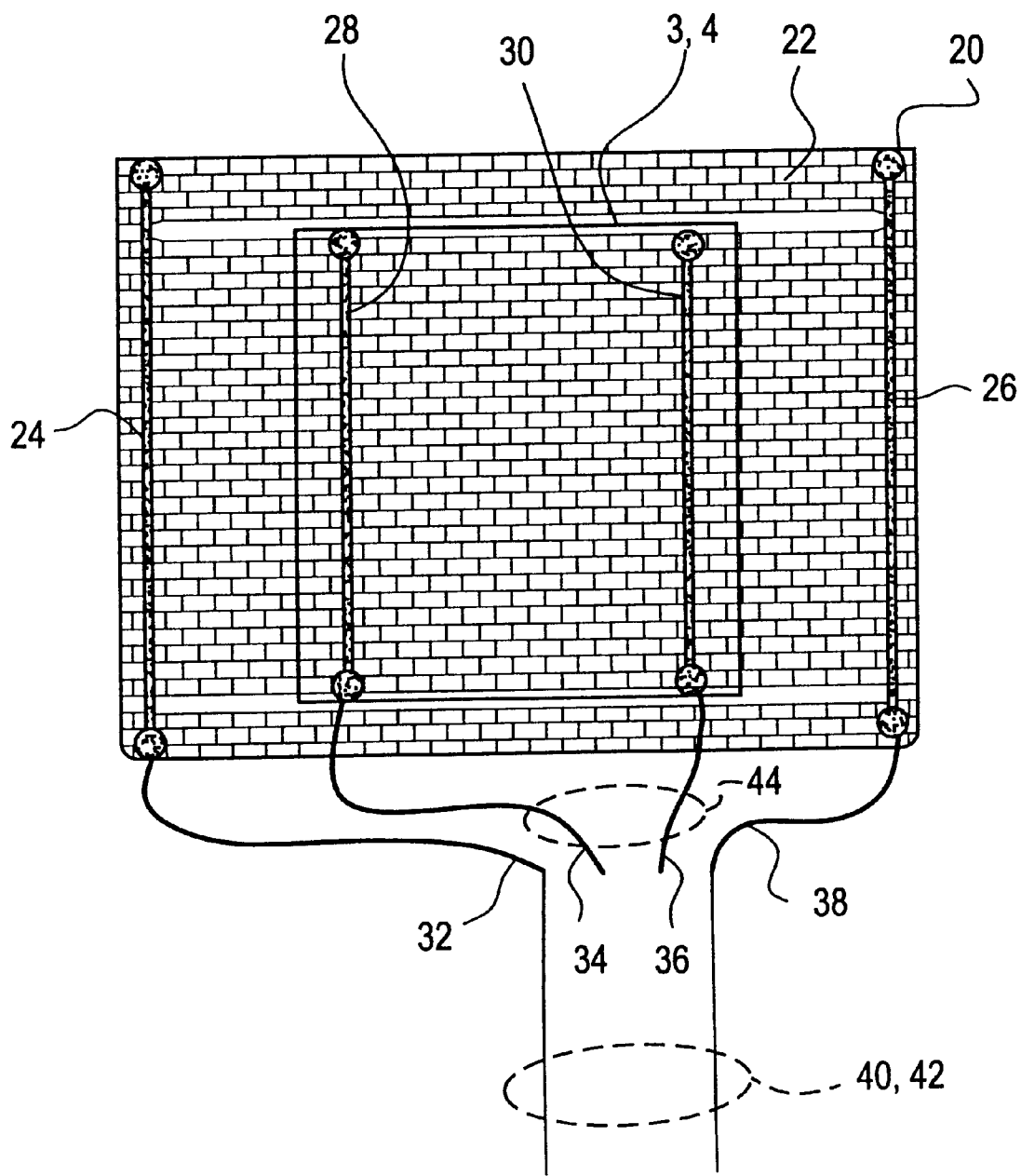
FIG. 2 top view onto a heating element that can be integrated beneath a seat cover.

FIG. 2 shows a preferred version for heating the ventilation areas 3, 4 and the heating surfaces 5 to 8.

On a surface 20, which corresponds to the basic area of the ventilation area 3 and the heating surfaces 5, 7 or the ventilation area 4 and the heating surfaces 6, 8, a plate-like heating element 22 is installed. The heating element 22 is preferably made of a textile, electrically conductive material. This ensures good air permeability of the seat surface.

Two main electrodes 24 and 26 that are connected in an electrically conductive way with the heating element 22 run along the side of the heating element 22. They are hooked up with a current source via electrical connecting lines 32, 38 and a control device 40, 42.

Additionally, two further electrodes 28, 30 are connected in an electrically conductive way with the heating element 22 on the sides of the area that corresponds to the ventilation areas 3, 4. They are also hooked up with a current source via electrical connecting lines 34, 36 and a control device 44.

The seat's function is described in the following.

During summer operation, a cool but physiologically safe temperature of the seat surface should be guaranteed. In this operating condition, air flows through the ventilation areas 3 and 4. This flow of air can be generated e.g. by ventilators that are integrated in the seat's interior (not shown). In order to prevent the user of the seat from becoming too cold, the ventilation areas 3 and 4 can be heated, while the heating surfaces 5 through 8 remain turned off.

This is realized using a design in accordance with FIG. 2 where current is passed into the heating element 22 over the entire length of the additional electrode 28. The current then flows through the heating element 22 in the direction of the additional electrode 30. In doing so, it heats the ventilation area 3 or 4 before leaving again via the additional electrode 30.

This ensures a cool seat surface on the one hand and optimal air flow temperature on the other hand.

During winter operation it is beneficial if all heated surfaces (3 through 8) are heated. In the initial phase of a mere heating operation, the ventilation remains turned off. In order to ensure sufficient moisture transport during continuous operation, air can then be blown through the seat surface in the ventilation areas 3 and 4. When penetrating the seat surface, the air is warmed to a comfortable temperature level by the integrated heating elements 22.

At the same time, however, the temperature on the seat surface in the ventilation areas 3 and 4 decreases, because the heating elements 22 cool off in this area. This would generate a temperature difference between the ventilation areas 3, 4 and the heating surfaces 5 through 8. The user would subjectively perceive the ventilation areas as being too cold or the heating surfaces as being too hot. In order to avoid such temperature differences between the heating surfaces 5 through 8 and the ventilation areas 3, 4, the heating power can therefore be increased in the ventilation areas 3,4 and with it the local temperature of the seat surface.

Winter operation in a version according to FIG. 2 is realized by letting the current flow through the entire surface 20 of the heating element via the main electrodes 24 and 26. This way the entire surface, including that of the ventilation area 3 or 4, is warmed up. In order to raise the temperature of the ventilation area 3 or 4 separately, the current density in the ventilation area 3 or 4 can be increased additionally. To achieve this, current is fed into the heating element 22 via the additional electrodes 28, 30. This leads to a superposition of the current flow of the main electrodes 24 and 26 and the additional electrodes 28, 30 in the ventilation area 3 or 4. The increased local current flow leads to an appropriate local warming of the heating element 22.

Controlling of the seat can occur manually, for example with a control device (not shown) with separate control switches for venting and heating. It could also be regulated automatically and e.g. combined with an electronic switch with memorized characteristic temperature curves.

A favorable control process is achieved by integrating a temperature sensor in or close to the seat surface. It could prove beneficial to equip the heating surfaces 5 through 8 and the ventilation areas 3 and 4 with separate sensors and control them independently of each other. It would also be feasible, however, to install separate sensors only for the heating surfaces 5 through 8 on the one hand and the ventilation areas 3 and 4 on the other hand, or only for the back rest 1 and the seat surface 2, respectively.

Separate controls for the heating process can easily be achieved by providing for heating circuits for the ventilation areas that are electrically independent from the heating surfaces. However, this is not absolutely necessary. A serial connection of heating elements, which each can be bridged with the help of a variable resistance or a switch, would also be feasible.

Another possibility for controlling the temperature in the ventilation area 3, 4 independently of the additional heating surfaces would be a temperature equalization of the air flow before it is fed into the ventilation area 3, 4. For this, e.g., an air conditioning unit that is installed in the vehicle could be used.

In the designs described above, the heating surfaces and the ventilation areas do not have to be located at a distance from each other. It might also be useful to have the heating surfaces and the ventilation areas mesh with each other in a comb-like manner, have them integrated into each other or overlapping each other. This way, favorable coverage of the surface areas and an even arrangement of both zones can be achieved on the seat surface.

What is claimed is:

1. A seat comprising a seat surface and a back rest surface, at least one of said seat surface and said back rest surface having at least one vented and heated ventilation area with an adjustable temperature for coming into contact with a user and at least one additional heated heating surface with an adjustable temperature arranged in lateral relationship to said at least one ventilation area, wherein the temperature of said ventilation area is adjustable independently of the temperature of said heating surface.

2. A seat according to claim 1, wherein said at least one ventilation area and said at least one heating surface include a common heating element.

3. A seat according to claim 2, wherein said common heating element includes a plate-like resistance heating element configured such that the current density in said ventilation area can be controlled independently of the current density in said heating surface.

4. A seat according to claim 1, wherein both said seat surface and said back rest surface have at least one vented and heated ventilation area for coming into contact with a user and at least one additional heated heating surface arranged in lateral relation to said at least one ventilation and the temperatures of said at least one ventilation area and said at least one heating surface of said back rest surface can be controlled independently of the temperatures of said at least one ventilation area and said at least one heating surface of the seat surface.

5. A seat according to claim 1, further comprising a control device switchable between two different switch positions wherein in one of said two switch positions the ventilation area is vented and heated whereas the heating surfaces is not heated.

6. A seat comprising a seat surface and a back rest surface, at least one of said seat surface and said back rest surface having at least one vented and heated ventilation area with an adjustable temperature for coming into contact with a user and at least one additional heated heating surface with an adjustable temperature arranged in lateral relation to said at least one ventilation area, wherein the temperature of said ventilation area is adjustable independently of the temperature of said heating surface, said at least one ventilation area and said at least one heating surface including a plate-like resistance heating element, the current density of which in the ventilation area being controlled independently of the current density in the heating surface.

7. A seat comprising a seat surface and a back rest surface, each having at least one vented and heated ventilation area with an adjustable temperature for coming into contact with a user and at least one additional heated heating surface with an adjustable temperature arranged in lateral relation to said at least one ventilation area, wherein the temperature of at least one of said seat surface and said back rest surface in said respective ventilation area is adjusted independently of the temperature of said heating surface thereof, and the temperature of said at least one ventilation area and said at least one heating surface of said back rest surface can be controlled independently of the temperature of said at least one ventilation area and said at least one heating surface of said seat surface.

* * * * *